May 29, 1962 L. H. MAMMEL 3,036,786

STORAGE REEL SHIFTING MECHANISM

Filed Oct. 3, 1960 3 Sheets-Sheet 1

INVENTOR
L. H. MAMMEL
BY [signature]
ATTORNEY

May 29, 1962 L. H. MAMMEL 3,036,786

STORAGE REEL SHIFTING MECHANISM

Filed Oct. 3, 1960 3 Sheets-Sheet 2

INVENTOR
L. H. MAMMEL
BY [signature]
ATTORNEY

May 29, 1962 L. H. MAMMEL 3,036,786

STORAGE REEL SHIFTING MECHANISM

Filed Oct. 3, 1960

3 Sheets-Sheet 3

INVENTOR
L. H. MAMMEL
BY [signature]
ATTORNEY

United States Patent Office 3,036,786
Patented May 29, 1962

3,036,786
STORAGE REEL SHIFTING MECHANISM

Lewis H. Mammel, Murray Hill, N.J., assignor to Bell Telephone Laboratories, Incorporated, New York, N.Y., a corporation of New York
Filed Oct. 3, 1960, Ser. No. 60,115
12 Claims. (Cl. 242—55.13)

This invention relates to apparatus for handling tapes such as magnetic tapes and, more particularly, to such apparatus adapted to shift the positions of a plurality of pairs of tape storage reels to make available any specific one of the pairs of reels to a single set of driving elements for propelling tape past a single recording or reproducing point.

Automation is becoming prevalent in many industries to carry out functions which had previously been performed by human operators. Much of the equipment required in automation involves the storage of vast amounts of information which must, at the same time, be available for ready access. One form of storage which has received wide acceptance involves the use of magnetic tapes or other tapes upon which information can be stored in coded form.

In the field of information storage, a convenient "figure of merit" for storage devices under consideration is the cost per bit of information capable of being stored. In the past, automatic access to voluminous quantities of information stored on tape has been achieved by placing the tape on paired, driven reels and providing each pair of reels with its own set of driving elements and reproducing and/or recording head. The particular pair of reels upon which the required information is stored or to be recorded, in this manner, is made accessible merely by a command to the proper set of driving elements to propel the tape past its corresponding head.

With the development of improved recording and reproducing heads and driving elements and arrangements, which make high speed operation feasible, the cost of this equipment has risen accordingly. Consequently, as the state of technology advances, the cost per bit of information stored in apparatus that requires individual sets of driving elements and heads for each pair of reels is becoming prohibitive, rendering tape as a mode of information storage less attractive.

It is, therefore, the object of the present invention to reduce the complexity of the elements required to drive tape from any given pair of a plurality of pairs of tape storage reels and to record or abstract information recorded thereon.

In accordance with the above object, a single recording and reproducing station is provided for a plurality of tape reel pairs and used selectively thereby. A pair of arbors having parallel axes support a plurality of pairs of tape storage reels disposed on the arbors such that one reel of each pair of reels is located on each arbor. Tape guides associated with each arbor guide the axial movement of the tape which spans the separation between arbors, forming a continuous path of tape between each reel on one arbor and its mate on the other arbor. The arbors each comprise three sections—two fixed end sections and a rotatable center section, substantially equal in width to one reel, sandwiched therebetween. Torque is transmitted by means of mechanical linkages to the rotatable center sections to drive a pair of reels thereon in cooperation with other tape driving elements, not a part of the present invention, past a recording or reproducing head. The arbors are provided with splines running parallel to their axes which engage mating slots on the reels to preclude relative rotary motion between the stationary reels and the fixed sections and also to facilitate the transmission of torque through the center section to the reels being driven.

In order to gain access to information stored on a particular pair of reels, a carriage which embraces all the reels on both arbors and both tape guides, translates the reels and tape guides along their respective arbors until the reels of the desired pair are located on the rotatable center section. By translating the paired reels and maintaining the recording and reproducing station and its associated equipment stationary, the present invention may employ newly developed heads and driving elements, used to effect high speed operation, which themselves are not readily movable. For example, the tape handling apparatus disclosed in copending application Serial No. 743,110 of F. G. Buhrendorf and L. H. Mammel, filed June 19, 1958, and assigned to the assignee of the present application, is completely compatible with the apparatus of the present invention.

According to another feature of the invention, means actuated by movement of the mechanical linkages parallel to the arbor axes prevent the transmission of torque through the mechanical linkages and align the splines of the end sections of each arbor with the splines of the center section thereof to prepare for shifting a new pair of reels into drive position. Moreover, means actuated by the return movement of the mechanical linkages after the new pair of reels is shifted into drive position enable the transmission of torque through the mechanical linkages and locate the newly positioned reels on the center sections of the arbors with a high degree of accuracy.

The above and other features of the invention will be considered in detail in the following specification taken in conjunction with the drawings, in which.

Figure 1:
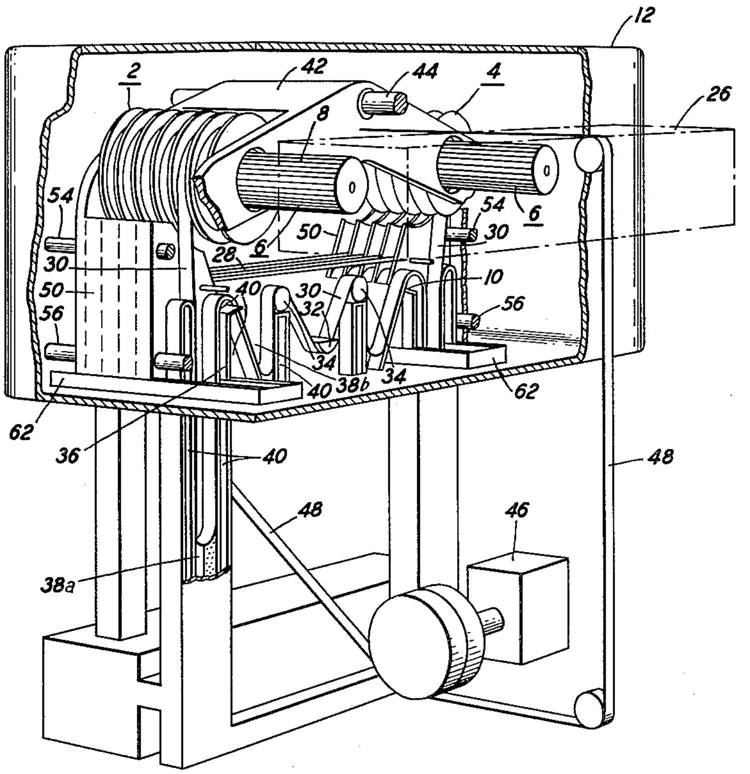
FIG. 1 is a perspective view of tape handling apparatus employing the principles of the invention.
Figure 3:
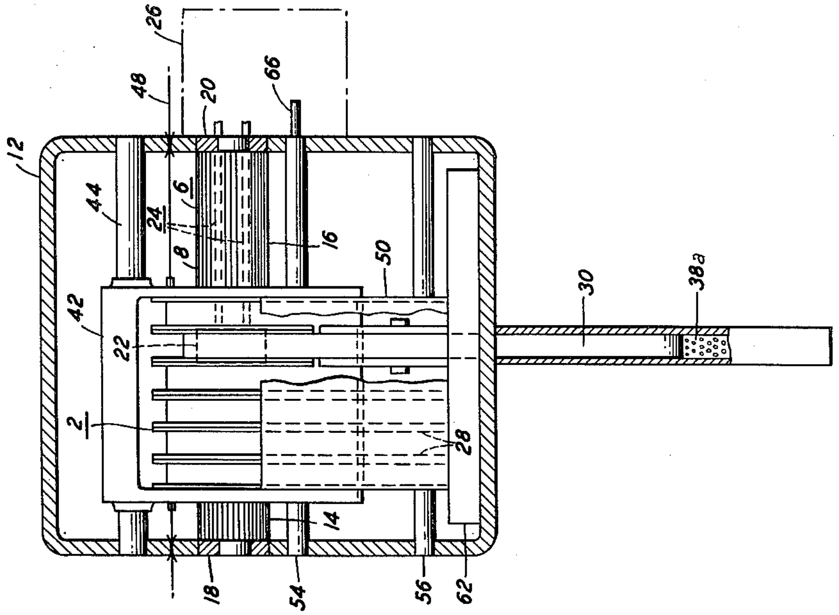
FIG. 2 and FIG. 3 are front and side elevations, respectively, of the tape handling apparatus of FIG. 1.
Figure 2:
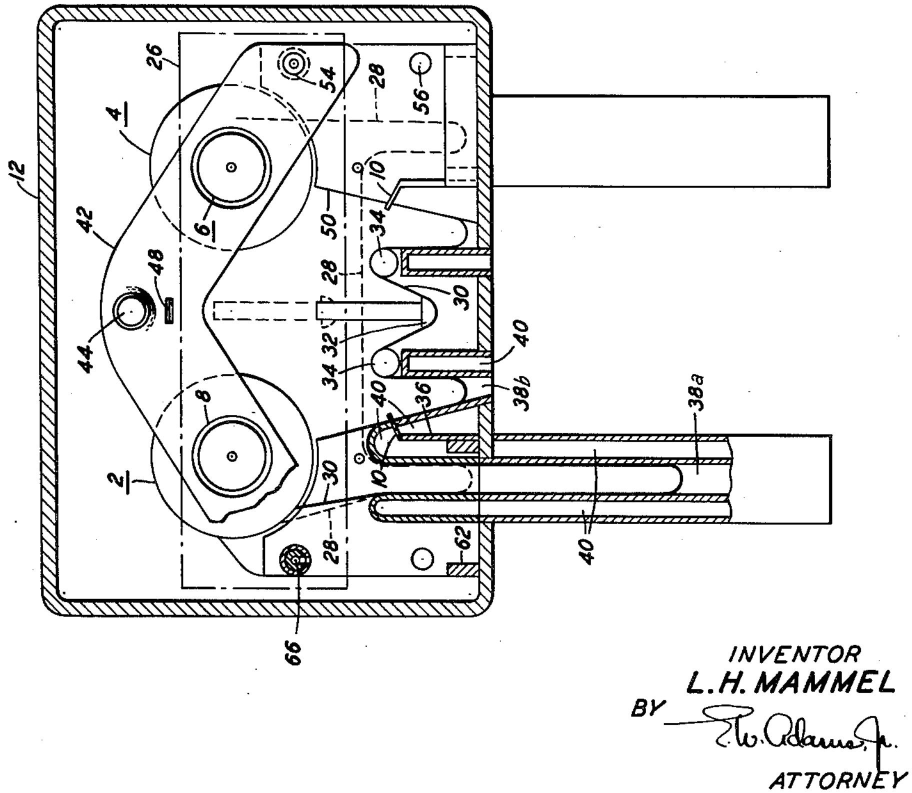

In the drawings, in which like numerals denote like elements, it will be observed that FIGS. 1, 2 and 3 illustrate tape handling apparatus in connection with which the principles of the present invention may be described in detail. Tape storage reels are held in axially aligned banks 2 and 4 by a pair of arbors 6. Symmetry of the tape handling apparatus, for the most part, exists about a plane parallel to and equidistant from the axes of arbors 6. In most instances, therefore, only one of each pair of elements is numbered in FIGS. 1 and 2. Arbors 6 each consist of fixed sections 14 and 16 (FIG. 3), fastened to and supported by opposite walls of an airtight enclosure 12 at 18 and 20, and a rotatable center section 22 sandwiched between the fixed sections. Rotary motion to propel the tape is imparted to center section 22 by a power source 26 through a mechanical linkage 24 (FIG. 3).

Splines 8 on arbors 6 run parallel to the arbor axes and engage with mating slots or grooves 9 (FIG. 8) on the reels which form banks 2 and 4, thus preventing relative rotation of the reels when positioned on either of fixed sections 14 and 16 and facilitating the transmission of torque to the reels when positioned on center sections 22. Splines 8 on fixed sections 14 and 16 and center sections 22 are susceptible of alignment to form continuous splines running the length of arbors 6.

The tape on each reel of bank 2 is draped across the separation between arbors 6 to a corresponding reel of bank 4. Tapes 28 from the stationary reels are looped, as shown by the dashed line in FIGS. 2 and 3, and stretched across the separation, while a tape 30 from the pair of reels positioned for rotation on center sections 22 is looped, as shown by the thick solid line. Tape 30 is driven across a recording and/or reproducing head 32 by a pair of capstans 34 working in cooperation with center sections 22.

The features of the copending Buhrendorf and Mammel application, heretofore referred to, are incorporated in the embodiment illustrative of the present invention. Air is introduced into airtight enclosure 12 at some pressure greater than that of the atmosphere, and loops are formed in chutes 38*a* and 38*b* due to the pressure differential which results. (The bottoms of chutes 38*a* and 38*b* are maintained at normal air pressure.) At the same time air at a pressure greater than that of enclosure 12 is introduced into chambers 40. Air escapes through capillary perforations in the walls of chambers 40 to maintain a film of air upon which the tape may "float," thus reducing friction. As described more fully in the Buhrendorf-Mammel application, chutes 38*b* cooperate with chutes 38*a* to maintain the tape being driven under uniform tension during passage over head 32.

When it is desired to position a new pair of reels on rotatable center sections 22 for propulsion past head 32, tape 30 from the reels presently positioned on rotatable sections 22 is drawn up chutes 38*a* and stretched across the separation between arbors 6 to coincide with the profile in FIG. 2 of tapes 28 by means not disclosed herein. In this condition the tape is prepared for translation parallel to arbors 6.

Thrust applied to mechanical linkage 24 of each of arbors 6 by power source 26 interrupts or prevents the rotation of center sections 22 by locking the splines on rotatable center sections 22 in alignment with those on fixed sections 14 and 16. The same thrust movement retracts from the surface of arbors 6 detents for axially aligning reels accurately on rotatable center sections 22. The equipment for the performance of these functions and its mode of operation will be explained in more detail in connection with FIGS. 4, 5 and 6.

Banks 2 and 4 and associated tape are now ready to undergo translational movement parallel to the axes of arbors 6. A carriage 42, supported by a shaft 44, embraces both banks 2 and 4, and translates them along arbors 6, to position the desired reels on rotatable center sections 22. Carriage 42 is actuated by a drive means 46 acting through a steel tape 48.

After the new pair of reels is positioned on rotatable center sections 22, thrust is applied to mechanical linkage 24 of each of arbors 6 in the direction opposite to that first applied to unlock the alignment of the splines on rotatable center sections 22 with those on fixed sections 14 and 16 and return the detents in rotatable center sections 22 to axially align the reels thereon.

The tape on the newly positioned reels is finally threaded as was described for tape 30 and access to the required information may readily be gained.

Carriage 42, in addition, embraces a pair of tape guides 50, each supported by the shafts 54 and 56 and directed along the rails 62, whose function it is to locate accurately the axial position of the tape spanning the gap between the newly positioned reels about to be threaded. Rubber seals 10 maintain the pressure of chambers 40, formed by the section of tape guides 50 supporting tape 30 and stationary walls 36, at a pressure greater than that of enclosure 12. Thus, despite the mobility of tape guide 50, an airtight chamber 40 is formed between it and stationary wall 36.

The axial position of tape guides 50 is located accurately by detents on shafts 54 which may be retracted and returned, at the same time during the reel changing operation as the detents on arbors 6, by the internal shafts 66 of shafts 54, with thrust applied by power source 26. Further discussion of this structure appears below in connection with FIG. 7.

Figure 4:
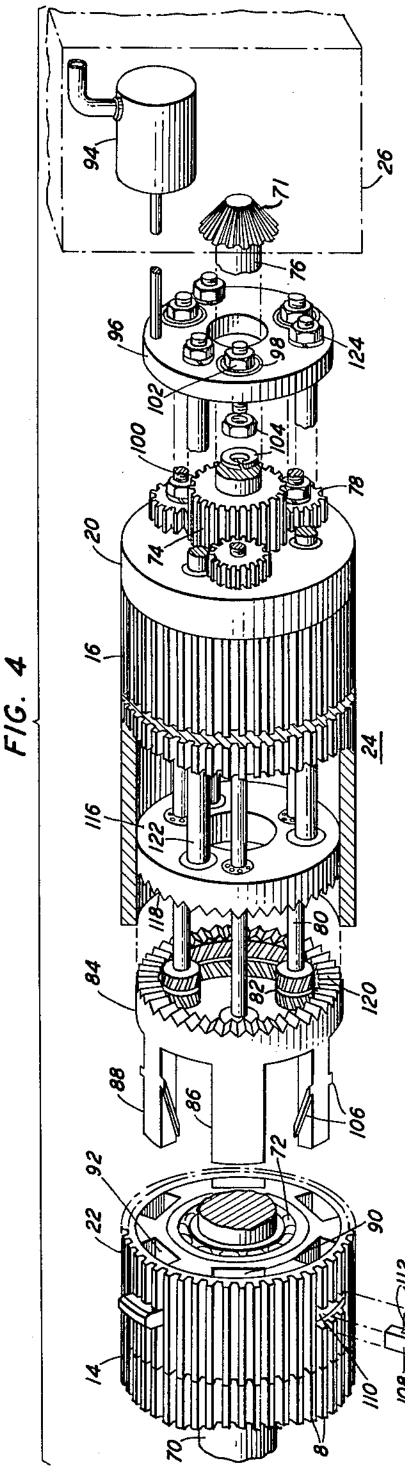
FIG. 4 is a perspective view of one of the arbors employed to bring about the desired translational and rotational motion.
Figures 5, 6, 7, 8:
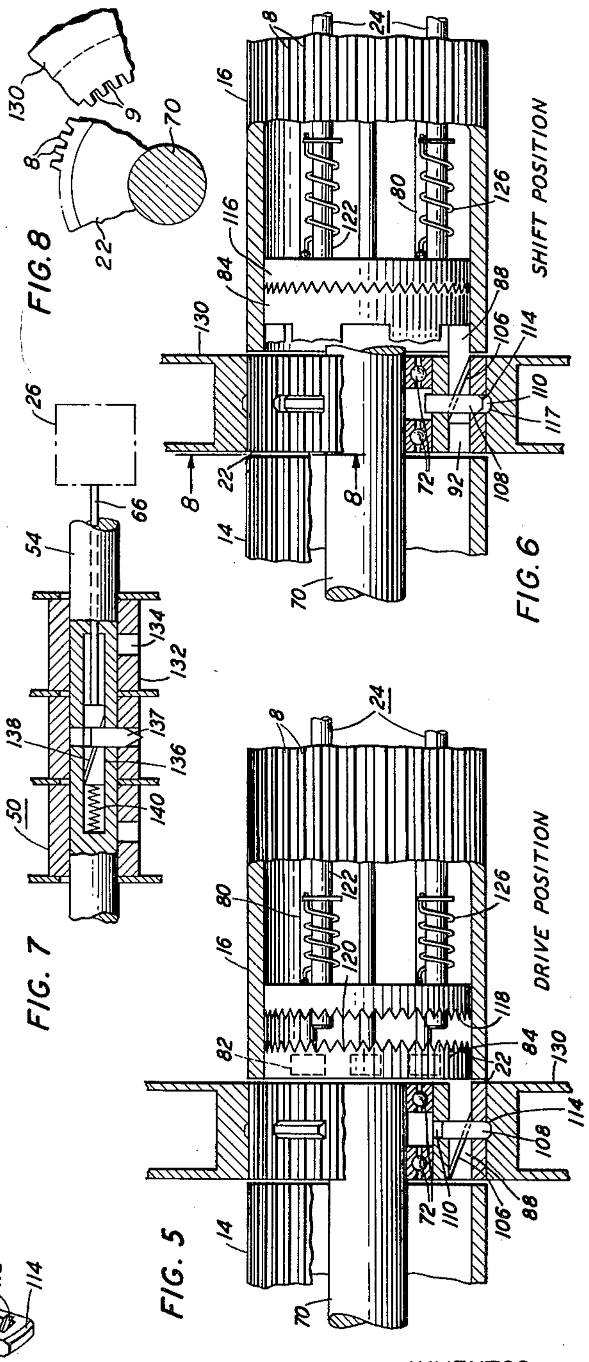
FIG. 5 and FIG. 6 are side elevations, partly in section, illustrating the arbor of FIG. 4 in drive and shift positions, respectively.
FIG. 7 is a side elevation of the apparatus for aligning the tape guide.
FIG. 8 is a fragmentary sectional view taken along line 8—8 of FIGURE 6 which illustrates the splines on the arbors and corresponding grooves on the reels.

FIGS. 4, 5 and 6 delineate in detail the construction of arbors 6. A solid shaft 70, which is mounted on the wall of enclosure 12 at 18 and 20 (FIG. 3), supports arbor 6 and the reels thereon. Center section 22 is journalled in ball bearings 72 for rotation on shaft 70 between tubular fixed sections 14 and 16 (only a portion of section 14 being shown in FIGS. 4, 5 and 6).

Torque is transmitted from power source or drive unit 26 to center section 22 through mechanical linkage 24 by means which will now be described. A bevel gear 71 (FIG. 4) receives torque from power source 26 and applies it to a sun gear 74 through a connecting shaft 76. Sun gear 74 distributes torque to three spur pinions 78 mounted on three parallel connecting shafts 80, positioned preferably 120 degrees apart, and terminated in herringbone pinions 82. Shafts 80 pass through roller or needle bearings in the end of fixed arbor section 16 at 20 and extend interiorly of center section 22 where herringbone pinions 82 drive an internal herringbone ring gear 84 formed with three unramped fingers 86 and three ramped fingers 88 as an integral part thereof. Preferably, unramped fingers 86 and ramped fingers 88 are placed in alternate positions and equidistant from one another around the periphery of ring gear 84. Fingers 86 and 88 engage mating slots 90 and 92, respectively, fingers 86 to transmit torque to center section 22 and fingers 88 for a purpose to be disclosed subsequently.

As stated above, it is required of mechanical linkages 24 of arbors 6 to respond to axial thrusts by performing specified functions. In the discussion of these functions, FIGS. 5 and 6 which illustrate arbor 6 in the drive position (torque is transmitted readily by mechanical linkage 24 to center section 22 in order to propel the tape) and the shift position (fixed sections 14 and 16 and center section 22 are locked in alignment for shifting reels preventing rotation by mechanical linkage 24), respectively, will be informative. To transform the arbor from the drive position to the shaft position a thrust from power source 26, here provided by an air cylinder 94, moves a push plate 96 from right to left (in FIG. 4). Extensions 100 of shafts 80, upon which spur pinions 78 are mounted, are journalled in ball bearings 98, supported by push plate 96. Convenient means, shown in FIG. 4 as nuts 102 and 104, on each shaft extension 100 serve to transmit thrusts on push plate 96 to spur pinions 78. Push plate 96 drives spur pinions 78 axially along sun gear 74, which is sufficiently wide with respect to spur pinions 78 to allow the full required axial movement of spur pinions 78 to take place without disengagement from sun gear 74. The axial movement of spur pinions 78, like the rotary movement thereof, is transmitted through connecting shafts 80 to herringbone pinions 82. The nature of herringbone teeth permits transmission of both torque and thrust. Accordingly, the axial movement is transmitted to internal herringbone ring gear 84, resulting in changes in the amount of engagement of fingers 86 and 88 with slots 90 and 92, respectively.

Ramped fingers 88 are each provided with a pair of ramps 106. Three detents 108, one furnished for each of ramped fingers 88, extend through slots 110 in center section 22. These detents are roughly U-shaped and straddle ramped fingers 88 within center section 22. They have rabbets 112 on their inner walls to ride on ramps 106. The movement of detents 108 is restricted to a radial direction by the walls of rectangular slots 110. As ramped fingers 88 move axially, detents 108, to maintain engagement between rabbets 112 and ramps 106, move radially. Movement of ramped fingers 88 from right to left in FIG. 4 results in an outward movement of detents 108, and vice versa. The beveled edges 114 of detents 108 seat in a beveled groove 117 cut around the inside perimeter of a reel 130 (FIG. 6), thereby accurately positioning reel 130 on center section 22.

The end of fixed section 16 at 20 and a transverse section 116, which is fixed to the inner surface of tubular section 16, lend support to shafts 80. The roller bearings in which shafts 80 traverse the end of fixed section 16 at 20 are duplicated in transverse section 116. They furnish a low frictional medium between shafts 80 and the end at 20 and transverse section 116 as to both rotational and axial movement.

In addition, transverse section 116 provides a surface upon which a set of crown bevel teeth 118 is placed. Crown bevel teeth 118 are located with respect to splines 8 of fixed sections 14 and 16 such that engagement with a mating set of crown bevel teeth 120 cut on internal herringbone ring gear 84 always produces alignment of splines 8 of fixed sections 14 and 16 with those on center section 22. Thus, even though splines 8 might initially be misaligned due to a previous rotation of center section 22, alignment will be achieved by translating internal herringbone ring gear 84 from left to right until engagement is attained between the crown bevel teeth. The engagement of teeth 118 with teeth 120 also prevents the transmission of torque to center sections 22.

The three guide rods 122, each attached to push plate 96 by a nut and washer 124, are employed to prevent cocking of push plate 96 so that the applied thrust is evenly distributed among spur pinions 78. Guide rods 122 extend through the end at 20 and transverse section 116. Springs 126, fastened between fixed transverse section 116 and each of guide rods 122, restore mechanical linkage 24 to the shift position when the driving pressure in air cylinder 94 is released. Since air cylinder 94 provides a thrust from right to left, springs 126 are of the compression variety. Of course, if air cylinder 94 pulls mechanical linkage 24 from left to right, springs 126 would be the tension type.

Thrust from air cylinder 94 is transmitted by mechanical linkage 24 to move ramped fingers 88 from right to left, thereby causing outward movement of detents 108 to engage and axially align reel 130. This is the drive position of arbor 6 enabling the transmission of torque to center section 22.

The return of mechanical linkage 24 by springs 126 upon relaxation of air cylinder 94 retracts detents 108 from the surface of arbor 6 and engages crown bevel teeth 120 with crown bevel teeth 118 to effect alignment of splines 8 of fixed sections 14 and 16 with those of center section 22. This is the shift position preventing the transmission of torque to center section 22.

FIG. 7 illustrates a cutaway end view of part of tape guide 50. Each of the sections 132 for axially aligning the tape of one pair of reels has an opening 134 into which a beveled detent 137 may move, thus aligning tape guide 50 in much the same way as reel 130 is aligned on center section 22. Movement of internal shaft 66 from right to left causes a ramped element 136 with ramps 138 to impart outward perpendicular movement to beveled detent 137. A spring 140 returns ramped element to retract beveled detent 137. As with the translation of mechanical linkages 24, an air cylinder, not shown, as a part of power source 26 may be employed to derive the required thrust for internal shaft 66. As in the case of arbors 6, beveled detents 137 must be retracted in the shift position and moved outward in the drive position.

What is claimed is:

1. In a tape handling apparatus, a plurality of pairs of spaced tape storage reels, each of said reels having grooves running parallel to its axis, means for supporting similar reels of each of said pairs of reels in axial alignment, each of said supporting means comprising a shaft having fixed end sections and a rotatable center section the width of which is substantially equal to the width of one of said reels, splines running parallel to the axes of said shafts located on the cylindrical surface of said end and center sections to engage said grooves on said reels, means for driving said center sections, means for shifting all said plurality of pairs of reels axially along said supporting means to bring a selected pair of reels into engagement with said center sections of said supporting means, and means for locking said splines on each of said center sections in alignment with those on said fixed sections to permit movement of said reels between said splined sections.

2. In a tape handling apparatus a plurality of pairs of spaced tape storage reels, means for supporting similar reels of each of said pairs of reels in axial alignment, each of said supporting means comprising a shaft having fixed end sections and a rotatable center section the width of which is substantially equal to the width of one of said reels, means for driving said center sections, means for aligning a point on the surface of each of said center sections with one of a plurality of points on the surface of said fixed sections, and means for moving all said plurality of pairs of reels axially along said supporting means to bring a selected pair of reels into engagement with said center sections of said supporting means.

3. A tape handling apparatus comprising two banks of tape storage reels, each bank comprising a plurality of axially aligned reels, each of which is connected by tape to a corresponding reel of the other bank, means for supporting said banks of reels with the respective reel axes substantially parallel, each of said supporting means comprising a shaft having fixed end sections and a rotatable center section the width of which is substantially equal to the width of one of said reels, means for driving said center sections, means for moving all said plurality of pairs of reels axially along said supporting means to bring a selected pair of reels into engagement with said center sections of said supporting means, and means for exactly locating the axial position of said selected pair of reels.

4. A tape handling apparatus comprising two banks of tape storage reels, each bank comprising a plurality of axially aligned reels, each of which is connected by tape to a corresponding reel of the other bank, means for supporting said banks of reels with the respective reel axes substantially parallel, means for driving a selected pair of reels, said selected pair comprising one reel from each of said banks, means for moving both of said banks axially along said supporting means to bring a newly selected pair of reels into drive position, and means movable with said last-named means for guiding the movement of the tape connecting said banks during the axial movement of said banks to insure accurate axial location of the tape of said selected pair of reels.

5. A tape handling apparatus comprising two banks of tape storage reels, each bank comprising a plurality of axially aligned reels, each of which is connected by tape to a corresponding reel of the other bank, means for supporting said banks of reels with the respective reel axes substantially parallel, means for driving a selected pair of reels, said selected pair comprising one reel from each of said banks, means for moving both of said banks axially along said supporting means to bring a newly selected pair of reels into drive position, means movable with said last-named means for guiding the movement of the tape connecting said banks during axial movement of said banks, and means for exactly locating the axial position of said tape guiding means to insure accurate axial location of the tape of said selected pair of reels.

6. In a tape handling apparatus, a plurality of pairs of spaced tape storage reels, means for supporting similar reels of each of said pairs of reels in axial alignment, each of said supporting means comprising a shaft having fixed end sections and a rotatable center section the width of which is substantially equal to the width of one of said reels, means for driving said center sections, means for moving all said plurality of pairs of reels axially along said supporting means to bring a selected pair of reels into engagement with said center section of said supporting means, and means for locking said center sections to prevent rotation thereof during the axial movement of said plurality of reels.

7. In a tape handling apparatus, a plurality of pairs of spaced tape storage reels, means for supporting similar reels of each of said pairs of reels in axial alignment, each of said supporting means comprising a shaft having fixed end sections and a rotatable center section the width of which is substantaily equal to the width of one of said reels, means for driving said center sections, means for aligning a point on the surface of each of said center sections with one of a plurality of points on the surface of said fixed sections, means for moving all said plurality of pairs of reels axially along said supporting means to bring a selected pair of reels into engagement with said center section of said supporting means, and means for exactly locating the axial position of said selected pair of reels.

8. A tape handling apparatus comprising two banks of tape storage reels, each bank comprising a plurality of axially aligned reels, each of which is connected by tape to a corresponding reel of the other bank, means for supporting said banks of reels with the respective reel axes substantially parallel, each of said supporting means comprising a shaft having fixed end sections and a rotatable center section the width of which is substantially equal to the width of one of said reels, means for driving said center sections, means for aligning a point on the surface of each of said center sections with one of a plurality of points on the surface of said fixed sections, means for moving both of said banks axially along said supporting means to bring a selected pair of reels into engagement with said center sections of said supporting means, means movable with said last-named means for guiding the tape connecting said banks during the axial movement of said banks to insure accurate axial location of the tape of said selected pair of reels, and means for exactly locating the axial position of said selected pair of reels.

9. In a tape handling apparatus, a plurality of pairs of spaced tape storage reels, means for supporting similar reels of each of said pairs of reels in axial alignment, each of said supporting means comprising a shaft having fixed end sections and a rotatable center section the width of which is substantially equal to the width of one of said reels, a mechanical linkage for each of said supporting means capable of transmitting both translational and rotational motion, a power source connected to said mechanical linkages to provide rotational and translational power to said mechanical linkages, means for applying rotational motion from said mechanical linkages to their respective center sections, means actuated by translation of said mechanical linkages in one direction for exactly locating the axial position of the reels on said center sections, and means actuated by translation of said mechanical linkages in the opposite direction for aligning a point on the surface of each of said center sections with one of a plurality of points on the surface of said fixed sections.

10. In a tape handling apparatus, a plurality of pairs of spaced tape storage reels, each of said reels having an annular tapered groove, means for supporting similar reels of each of said pairs of reels in axial alignment, each of said supporting means comprising a shaft having fixed end sections and a rotatable center section the width of which is substantially equal to the width of one of said reels, radially movable tapered wedges disposed in each of said center sections, a mechanical linkage for each of said supporting means capable of transmitting both translational and rotational motion, a power source connected to said mechanical linkages to provide rotational and translational power to said mechanical linkages, means for applying rotational motion from said mechanical linkages to their respective center sections, means actuated by translation of said mechanical linkages in one direction for moving said wedges in an outward direction to engage said grooves on said reels in order to accurately locate the axial position of said reels on said center sections, means actuated by translation of said mechanical linkages in the opposite direction for aligning a point on the surface of each of said center sections with one of a plurality of points on the surface of said fixed sections, means actuated by said last-described translation for retracting said wedges below the surface of said center sections, and means for moving all said plurality of pairs of reels axially along said supporting means to bring a selected pair of reels into engagement with said center sections of said supporting means.

11. In a tape handling apparatus, a plurality of pairs of spaced tape storage reels, means for supporting similar reels of each of said pairs of reels in axial alignment, each of said supporting means comprising a shaft having fixed end sections and a rotatable center section the width of which is substantially equal to the width of one of said reels, a mechanical linkage for each of said supporting means capable of transmitting both translational and rotational motion, a power source connected to said mechanical linkages to provide rotational and translational power to said mechanical linkages, means for applying rotational motion from said mechanical linkages to their respective center sections, means actuated by translation of said mechanical linkages in one direction for exactly locating the axial position of the reels on said center sections, means actuated by translation of said mechanical linkages in the opposite direction for aligning a point on the surface of each of said center sections with one of a plurality of points on the surface of said fixed sections, and means for moving of said plurality of pairs of reels axially along said supporting means to bring a selected pair of reels into engagement with said center section of said supporting means.

12. A handling apparatus for strips of flexible material, said apparatus comprising two banks each including a plurality of storage reels, with corresponding reels of the respective banks being connected by said strips of flexible material, means for supporting the reels of each of said banks with reel axes substantially parallel, each of said supporting means comprising a shaft having fixed end sections and a rotatable center section, means for driving said center sections, means for holding said reels in a rigid physical relationship with respect to said fixed end sections, means for moving both of said banks axially along said supporting means to bring a selected pair of reels into engagement with said center sections of said supporting means, and means for holding said selected pair of reels in a rigid physical relationship with respect to said center sections.

References Cited in the file of this patent

UNITED STATES PATENTS 2,561,503 D'Ornellas ------------- July 24, 1951